Sept. 11, 1934.　　　　O. EVINRUDE　　　　1,973,409
SHOP POWER TOOL
Filed Feb. 27, 1933　　　3 Sheets-Sheet 1

INVENTOR
Ole Evinrude
BY
Wheeler, Wheeler and Wheeler
ATTORNEYS

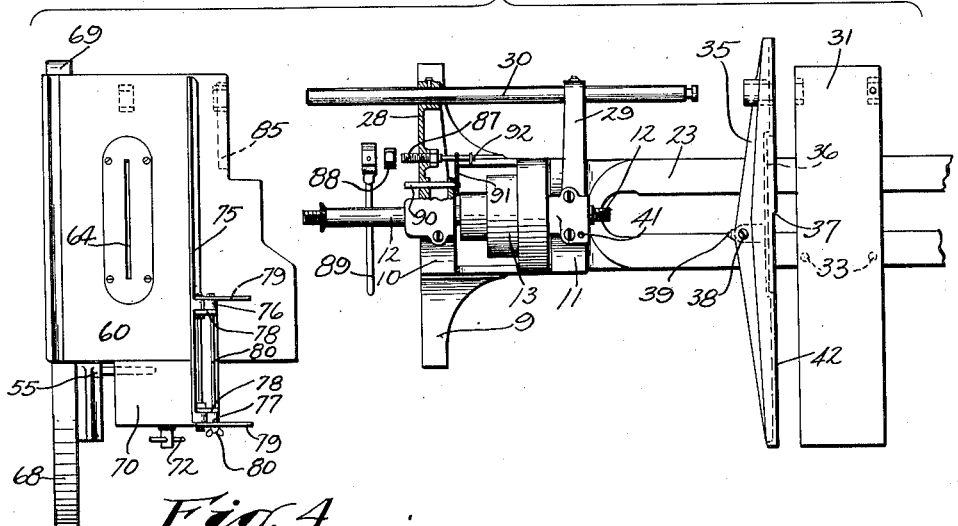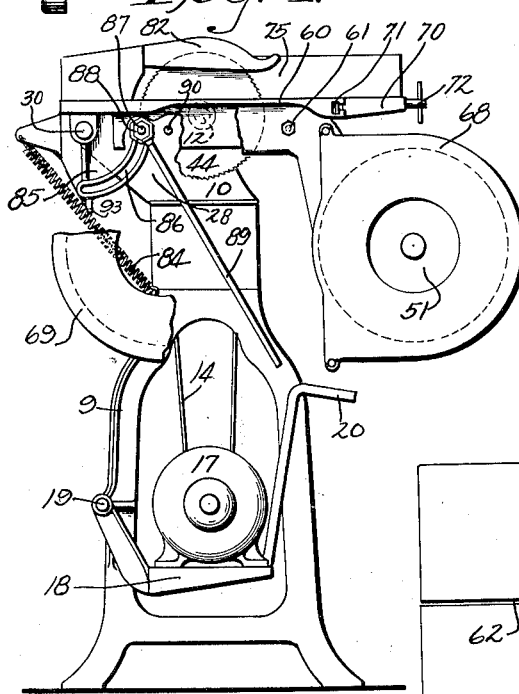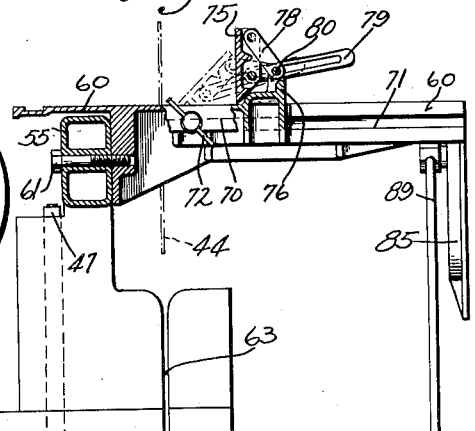

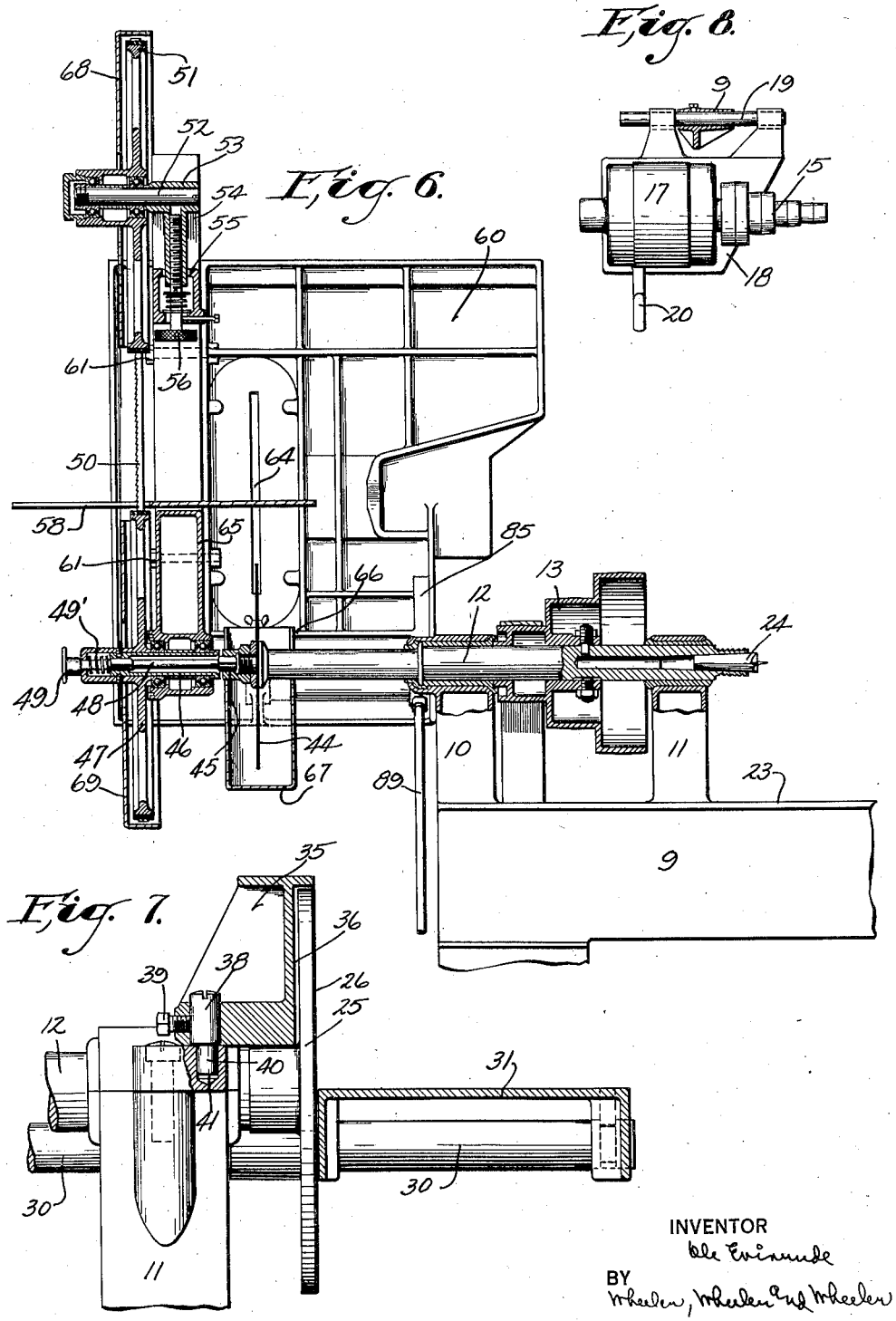

Patented Sept. 11, 1934

1,973,409

UNITED STATES PATENT OFFICE 1,973,409

SHOP POWER TOOL

Ole Evinrude, Milwaukee, Wis., assignor to Outboard Motors Corporation, Milwaukee, Wis., a corporation of Michigan Application February 27, 1933, Serial No. 658,702

14 Claims. (Cl. 144—1)

This invention relates to improvements in shop power tools.

It is a primary object of the present invention to provide a simple easily operated combination tool including in small compass all of the equipment necessary for woodworking, with means by which the devices for performing different types of work are available for alternative use, or may be moved to retracted positions entirely out of the way of the operator with a minimum loss of time in adjustment.

Specifically, the objects of the invention include the provision of circular and bandsaws having interconnected tables so that the movement of one to a position for use will automatically remove the other to its retracted position; the provision of circular and bandsaws so related that when the bandsaw is in use the circular saw is housed and its arbor serves to transmit motion to the bandsaw; to provide a novel and improved organization for a combination tool of this type, wherein a length of shafting parallel to a lathe bed and spaced rearwardly therefrom provides means upon either end of which tools accessory to the lathe may be removably mounted and adjustably positioned; to provide a novel and improved means whereby a sander is made alternatively available to perform the function of a jointer, the sanding disk being interchangeable with a lathe center; and generally to improve the effectiveness and facility with which a machine of this type may be adjusted and used.

In the drawings:

Figure 3 is a fragmentary detail view in plan showing the headstock portion of the lathe and the separated accessory equipment which is normally mounted detachably thereon.

Figure 4 is a view of the apparatus in end elevation, a portion of the bandsaw housings being broken away to expose the means by which the saw tables are maintained in adjustment.

Figure 5 is a view partially in front elevation and partially in axial section showing on an enlarged scale a detail of the interconnected saw tables.

Figure 6 is a view on an enlarged scale showing in front elevation the circular saw table in its inoperative position, the bandsaw and headstock being illustrated in axial section.

Figure 7 is an enlarged detail view showing the headstock and sanding disk in front elevation and illustrating the jointer fence and table in longitudinal section.

Figure 8 is a fragmentary detail view in plan of the motor mounting and adjustment.

Like parts are identified by the same reference characters throughout the several views.

Figure 1:
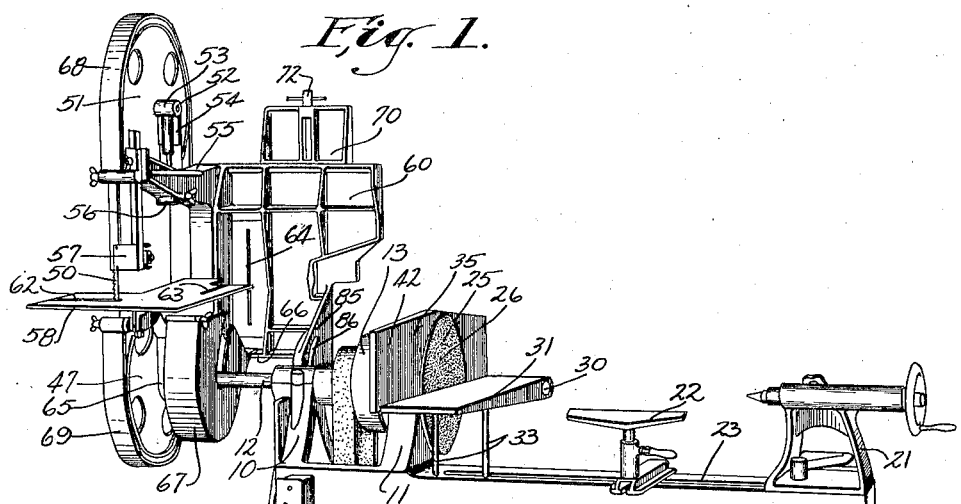
Figure 1 is a perspective view of apparatus embodying the invention as viewed from the right front quarter.

The apparatus is assembled upon a lathe frame 9 having spaced headstock bearings 10 and 11 from which the headstock spindle shaft 12 projects at both ends. Between the headstock members 10 and 11 is a step pulley 13 connected by belt 14 with the complementary step pulley 15 on the shaft 16 of motor 17. The motor is carried on a pivoted platform 18 which is slidably adjustable as well as pivotally movable upon a short length of shafting 19 (Fig. 8) carried by the frame. The weight of the motor tends to keep the belt 14 under proper tension, and a long handle 20 projects forwardly and upwardly to a position within easy reach of the operator's hand, whereby the tension may be removed from the belt for shifting purposes and whereby also, the motor and its platform 18 may be bodily adjustable axially to register different elements of its four step pulley 15 with a given element of the three step pulley 13.

The tailstock 21 and the tool rest 22 are adjustable in the lathe bed 23 in the usual way.

The headstock spindle 12 may be provided with the usual driving and centering point shown at 24 in Fig. 6, but may alternatively be provided with a sanding disk 25. Removably applied by adhesive or otherwise, to the face of this disk, is a corresponding disk of sandpaper 26 which serves not merely for sanding in finishing operations, but also is used as a jointer through means hereinafter to be described.

Figure 2:
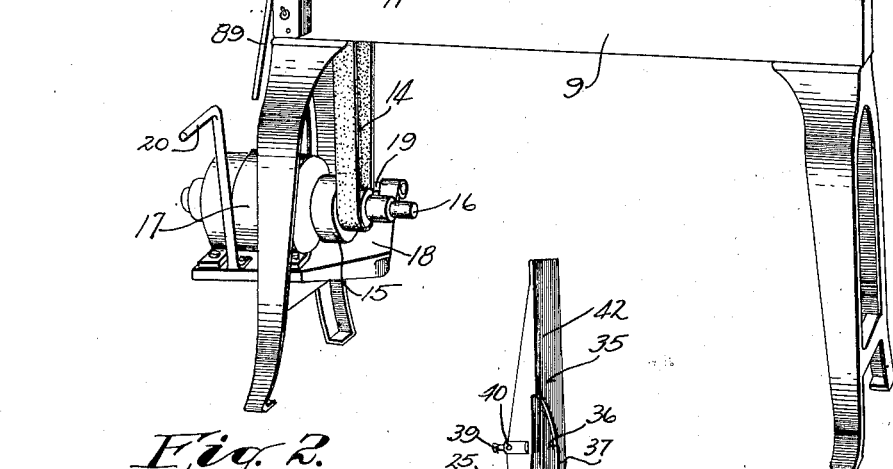
Figure 2 is a fragmentary detail of the apparatus shown in Fig. 1 illustrating different positions of adjustment to which certain of the parts may be manipulated by the operator.
Figure 2:
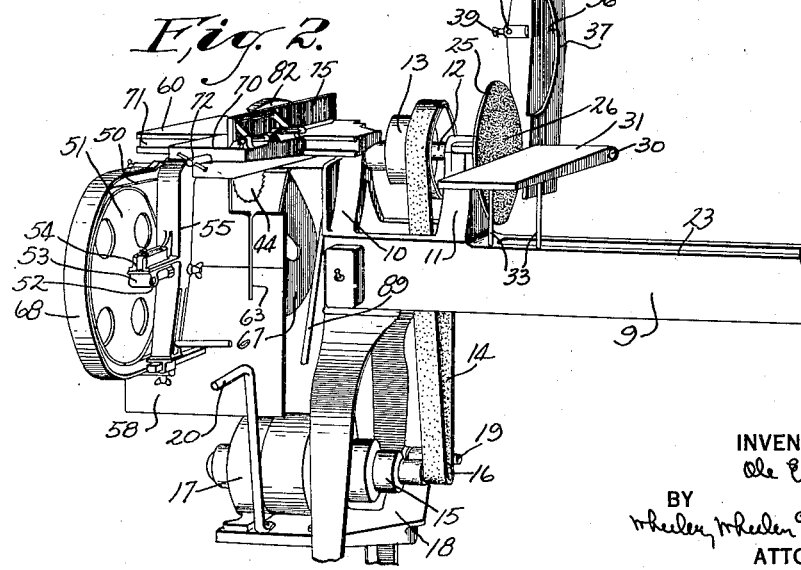

Projecting rearwardly from headstock brackets 10 and 11 are the arms 28 and 29 in which is fixed a shaft 30 parallel to the bed of the lathe and spaced rearwardly therefrom. It is particularly to be noted that both ends of this shaft are exposed to receive for support and adjustment numerous pieces of accessory equipment. One device removably mounted on the support 30 is the table 31 which is used to carry the work during a sanding operation. At times this table is lowered across the lathe bed in position for use as shown in Figs. 1, 2 and 7. At such times its forward end is supported by legs 33 which rest on the lathe bed. At other times the table may be oscillated about support 30 to an inoperative position wholly clear of the lathe bed, in which it will not in any degree interfere with the use of the lathe.

Where it is desired to use the sanding disk to perform a jointing function, a special jointing fence 35 is employed. This fence is also instantly adjustable between retracted and operative positions. Fig. 1 shows the fence in its operative position and Fig. 2 shows it elevated about support 30 as a fulcrum in its retracted position. The fence 35 is recessed at 36 to receive the disk 25 and its forward and rear guiding surfaces project differentially to provide a shoulder at 37 regulating the depth of cut made by the disk in a given transfer of the work (see Fig. 3). Within limits, the exact depth of cut is subject to regulation, the jointer being provided with a rotatable pin 38 held in adjustment by set screw 39 and having an eccentric projection 40 which engages in an aperture 41 of the headstock bracket 11.

By rotating the pin 38 with a screw-driver, the exact extent to which the abrasive sheet 26 projects from the forward face 42 of the fence 35 may be regulated, whereby very accurately to control the exact effect of the sander upon the work.

As a piece of jointing apparatus the sander has proven to be exceptionally effective since it not only dresses the work but leaves it with a smooth finished surface. In addition, it is far safer for the workman than any previously known jointer.

Upon the other end of support 30 is removably mounted a saw table assembly. The end of headstock spindle 12 which projects to the left from the headstock, carries at 44 a conventional circular saw and beyond that is provided with a squared socket 45 which may comprise a part of the nut which holds the circular saw in place. This squared socket 45 forms one member of a clutch for engaging spindle 12 with the drive shaft 46 of bandsaw pulley 47. The other clutch element comprises an axially movable rod 48 manipulated by handle 49 and having squared portions respectively engaged with shaft 46 and engageable with clutch element 45. A compression spring at 49' normally presses the clutch rod 48 to the right as viewed in Fig. 6. The bandsaw 50 which operates about pulley 47 also encircles an idler pulley 51 mounted on a shaft 52. The bearing 53 for this shaft is adjustable in a guideway 54 carried by frame arm 55, and is fixed in adjustment by means of a screw 56 by which proper tension may be maintained on the bandsaw. The end of arm 55 carries a conventional guide at 57 for the bandsaw.

The frame arm 55 and the bandsaw table 58 are parallel to each other and project substantially at right angles from the under surface of the circular saw table 60 to which the bandsaw frame is detachably connected by bolts 61. The bandsaw table is slotted at 62 for the bandsaw and at 63 for the circular saw. The circular saw table 60 requires only the usual single slot at 64.

The bandsaw frame member 65 and the circular saw table flange 66 support a circular saw guard 67 which is effective to completely enclose the circular saw when the bandsaw is elevated to a position for use as shown in Fig. 1. When the assembly is oscillated about support 30 to lower the circular saw table 60 to a position for use, the bandsaw, mounted thereon, automatically falls below the circular saw table and with it carries the guard 67 entirely clear of the circular saw. The circular saw is now shielded by its own table and the guard 82 mounted thereon. The bandsaw pulleys are provided with guards at 68 and 69 which, however, are of conventional design.

The effective size of the circular saw table 60 is increased without greatly increasing the over all dimensions of the assembly by providing an extension table 70 fitted to a dovetail slot 71 extending across the front of table 60 and fixed in adjustment by any suitable clamp operated by handle 72.

To the extension table is adjustably fixed the fence 75. The extension table carries brackets 76 and 77 to which the top of the fence is connected by links 78. Slotted link 79 connected with the bottom of the fence may be adjusted as shown in Fig. 5 and retained in clamping adjustment by a clamping bolt and a wing nut assembly 80. The fact that the fence is mounted upon the extension table 70 gives assurance that the extension table will always be in the most effective position to support the work which engages the fence in its movement across the saw. If the fence be moved across the front of table 60, the extension table 70 is inherently required to move with it.

A conventional type of yielding guard at 82 may be employed to cover the upper periphery of the circular saw 44 if desired.

As above noted, the saw table assembly, including the entire bandsaw apparatus, is pivotally adjustable about the support 30. For counterbalancing its weight it is preferred to provide a spring at 84 connected to the lathe frame 9 and to a web 85 on the saw table assembly. This web is formed to provide an arcuate slot 86 concentric with the support 30 as shown in Fig. 4.

A threaded stud 87 projects from the headstock bracket 10 and carries a clamping nut 88 with which a long handled wrench 89 is preferably permanently engaged. This wrench is directly accessible from the front of the machine and its range of movement is such that the saw table assembly may readily be clamped in either of its two extreme positions or in any intermediate position. The intermediate positions are particularly useful in fixing the extent to which the circular saw disk 44 would project through the slot 64 in the circular saw table 60. By manipulating the table assembly about support 30 any desired degree of saw projection can be secured.

In order to prevent the operation of the spindle 12 at its maximum speed when the bandsaw is in use, I provide an interlock which functions to arrest the movement of the saw table assembly if the belt is engaged with the smallest step of pulley 13, and conversely, prevents the belt from movement to the smallest step of pulley 13 if the bandsaw has previously been set up in position for use.

A pin 90 projects through the bracket 10 adjacent stud 7 and in the path of movement of portion 93 of the saw assembly (Fig. 4). This pin is reciprocable through the opening in which it is mounted, and its inner end carries a plate 91 movable across the face of pulley 13 to the extent permitted by stop 92 on the reduced and inwardly projecting end of stud 87 (Fig. 3).

If the belt is engaged with the smallest step of pulley 13, the pin is caused to project as shown in Fig. 3 into the path of portion 93 of the table assembly, and the table assembly cannot be raised to a position where it is possible to engage the bandsaw clutch. On the other hand, if the bandsaw is already in a position for use, the portion 93 of the table assembly will cover the end of pin 90 and the pin cannot be displaced sufficiently so that the belt may be accommodated on the smallest step of the pulley.

It is particularly to be noted that when the circular saw is in use, with its table adjusted so that the work clears the pulley 13, no part of the bandsaw mechanism interferes with the free movement of work of any size across the saw. The sanding disk 25 and the fence 35 are readily removable from the open end of the support 30, and likewise the fence assembly is readily removable from table 60 so that such large pieces of work as wallboard and the like will pass unobstructed over the circular saw table.

Similarly, it is to be noted that the fence 35 and the sanding table 31, as well as the sanding disk 25, may be almost instantly removed entirely from the apparatus, leaving the lathe completely unobstructed to receive any work within its capacity. Similarly, when the bandsaw is in use, its table is unobstructed to the full limit of the bandsaw capacity as determined by the diameter of its pulleys.

In order to bring the bandsaw into use it is only necessary to manipulate the wrench handle 89, swing the table assembly to a position such that the bandsaw table table is horizontal, manipulate the wrench 89 to clamp the parts in position, and release clutch handle 49 to engage the bandsaw pulley with the spindle shaft 12.

To use the circular saw it is only necessary to unclutch the bandsaw, release the clamp by manipulation of wrench 89, lower table 60 to a horizontal or any other desired position, and re-engage the clamp through manipulation of the wrench.

The support 30 is not only effective to mount releasably and adjustably the apparatus herein disclosed, but it is also available at all times for the support of other accessory apparatus such as screw cutting or other metal working apparatus to be used with the lathe. The double bracket organization which carries the support 30 with both ends free, is an important factor in contributing to the successful use of this type of support.

I claim:

1. In a machine tool, the combination with a rotatable tool provided with a supporting and driving shaft, of a table therefor adjustable to operative and inoperative positions with respect to said tool, a second tool supported from said table and provided with a supporting shaft adapted to be driven from the shaft of the first tool in the inoperative position of the table, and means for operatively connecting said shafts when said table is inoperative, said second tool having its own table connected with said first mentioned table in a position for movement to a level above the first tool when its supporting table is being adjusted to inoperative position, whereby each table may serve as a guard for one tool when in operative position with reference to the other.

2. In a device of the character described, the combination with a pair of saw tables connected together at an angle and provided with a pivotal mounting about which the table assembly is movable to positions in which the tables are alternatively substantially horizontal, a circular saw fixed as to location and adapted to project through one of said tables in the operative position thereof and from which said table is withdrawn in moving it to its inoperative position, a second saw fixed in position with respect to the other of the tables, and means for clutching said saws together when said other table is in a position for use.

3. The combination with a circular saw fixed as to position and a table therefor provided with a fulcrum about which the table is adjustable respecting said saw, of a complete bandsaw mechanism mounted on the under side of said table and including a second table projecting substantially at right angles beneath the first and adapted to be elevated above said circular saw to a position for use when said first table is oscillated about its fulcrum to a position retracted from said circular saw.

4. In a device of the character described, the combination with a pair of tables connected together substantially at right angles, one of said tables having an opening to receive a circular saw, of a circular saw, a driving and saw supporting shaft mounted in relatively fixed bearings, a table support spaced offset from said circular saw and its shaft and upon which the table assembly is fulcrumed, a bandsaw mechanism mounted beneath the circular saw table and associated with the other table, and means for operatively connecting said bandsaw mechanism to said circular saw shaft when said bandsaw table is in a position for use.

5. In a device of the character described, the combination with a rotary tool and a table therefor, of a fulcrum upon which said table is movable to and from operative relation to the tool, and a second table marginally connected at one end with an intermediate portion of said first mentioned table and disposed therebeneath in the operative position of the first mentioned table, the position of the second table being such that as said first table is moved pivotally to inoperative position, the second table will be brought to a substantially horizontal operative position above said tool.

6. In a device of the character described, the combination with a shaft and a rotary tool carried thereby, of a first table slotted to receive said tool and fulcrumed for pivotal movement to and from operative relation to the tool, the movement of the table toward inoperative position being adapted to withdraw the tool from the slot therein, a second table substantially at right angles to the first table and positioned to extend downwardly from an intermediate portion of the first table when the first table is in operative relation to said tool, a second tool connected with the second table for movement therewith to and from operative position, the operative position of the second table being the position in which the first table is inoperative, said second tool having a portion positioned in the operative position of the second table in alignment with said first tool and provided with coupling means for driving engagement with said first tool to receive motion therefrom, whereby such tools may be driven from a common source and used alternatively, each tool being covered by the table for the other tool when such other tool is in use.

7. In a device of the character described, the combination with a pair of tool mechanisms one of which is fixed against translative movement, of a slotted table for the fixed mechanism, means pivoting said table for movement to and from operative relation to said fixed mechanism, and a second table operatively connected with the first table and supported for movement to and from operative position, the operative position of the second table corresponding to the inoperative position of the first table, whereby said tables are alternatively available for use, the other of said tool mechanisms being associated with the second table, and said tables and mechanisms being so arranged that each of said tables, when in use, covers the tool mechanism associated with the other table.

8. In a device of the character described, the combination with a circular saw and means supporting said saw in a fixed location, of a slotted table for said saw, a fulcrum upon which said table is movable to and from operative position respecting said saw, a second table connected to an intermediate portion of the under side of the first table, bandsaw mechanism carried by said first table in operative relation to the second table and movable with said tables to and from a position in which said first table is inoperative and said second table is operative, means effective in said position for clutching said bandsaw to said circular saw, and a guard connected with said table assembly and movable therewith in closing said circular saw when said bandsaw and its table are in a position for use.

9. The combination of a work table pivotally supported near one margin and adapted to be swung from work supporting position to a position of non-use, a band saw and associated work table, each mounted on said pivoted table, and driving connections adapted to be coupled to the band saw when the first mentioned table is in its position of non-use and uncoupled to permit the pivoted table to be swung to a position for use.

10. The combination with a rotary tool having an arbor mounted in fixed bearings, of a work table pivotally supported near one margin and adapted to be swung from a work supporting position with reference to said tool to a position of non-use, another tool and associated work table mounted in assembled relation on said pivoted table, and provided with a driving arbor adapted to be coupled to the arbor of the first mentioned tool when the pivoted table is in its position of non-use.

11. The combination of a work table pivotally supported near one margin and adapted to be swung from a work supporting position to a position of non-use, a circular saw having an arbor mounted in relatively fixed bearings and with which said work table is associated for presentation of work to the saw when the table is in work supporting position, an auxiliary saw and associated work table mounted in assembled relation on the pivoted table, and a driving connection for said auxiliary saw positioned and adapted to be coupled to the arbor of the first mentioned saw when the pivoted table is in its position of non-use.

12. In a device of the character described, the combination with a power driven saw and a supporting shaft mounted in normally fixed bearings, of a work supporting table pivoted for swinging movement about an axis parallel to said shaft into and out of operative relation to said saw, a second saw and associated table carried by the pivoted table for swinging movement therewith, said second saw having a driving shaft adapted to be coupled with that of the first mentioned saw when the pivoted table is in its inoperative position, said pivoted table being adapted to swing to a guarding position above the second saw when the latter with its table are in inoperative position.

13. In a device of the character described, the combination with a power driven saw and a supporting shaft mounted in normally fixed bearings, of a work supporting table pivoted for swinging movement about an axis parallel to said shaft into and out of operative relation to said saw, a second saw and associated table carried by the pivoted table for swinging movement therewith, said second saw having a driving shaft adapted to be coupled with that of the first mentioned saw when the pivoted table is in its inoperative position, a guard for the lower portion of the first mentioned saw carried by the work table of the second saw, and a guard for the upper portion of the first mentioned saw carried by the upper surface of its associated table, the second saw also having a guard movable with the pivoted table.

14. The combination with a saw mounted in fixed bearings, of a work table for said saw adjustable into and out of work supporting position with reference to said saw, an auxiliary tool connected with the work table for movement therewith, and means for driving the auxiliary tool when said work table is in non-work supporting position, said auxiliary tool being concealed in an inoperative position by said work table when the latter is operatively associated with the saw.

OLE EVINRUDE.